March 14, 1961 W. E. OSBORNE 2,975,284
CONTROLLED APPROACH AIRCRAFT LANDING SYSTEMS
Filed Nov. 15, 1956 5 Sheets-Sheet 1

FIG. 3A.
Transparent Gridded Plate, Evenly Spaced Lines

FIG. 3B.
Transparent Gridded Plate, Variably Spaced Lines

INVENTOR
William E. Osborne

BY *Morre J Hall*

ATTORNEYS

INVENTOR
William E. Osborne

FIG. 7.

United States Patent Office 2,975,284
Patented Mar. 14, 1961

2,975,284

CONTROLLED APPROACH AIRCRAFT LANDING SYSTEMS

William E. Osborne, 1805 Palisade Drive, Reno, Nev.

Filed Nov. 15, 1956, Ser. No. 622,487

20 Claims. (Cl. 250—83.3)

The present invention relates to aircraft landing systems, particularly of the type wherein the pilot of a landing aircraft is provided with a characteristic indication of his speed and movement relative to a landing location, whereby a controlled approach landing may be effected. In this respect, the present invention is primarily concerned with improved aircraft landing systems utilizing infra-red photoconductive devices in affording the aforementioned characteristic indication, whereby the overall landing system has a minimum susceptibility to counter measures.

Various systems for effecting ground control or controlled approach landing of an aircraft have been suggested in the past; and for the most part such systems operate on radar principles whereby an approaching aircraft is detected and its position and movement relative to a landing location are communicated to the aircraft pilot by radio communication. With ever increasing amounts of radar jamming and rapidly improving counter measures known at the present time, such ground approach radar systems can be almost completely nullified through the use of swept frequency transmissions and continuously changing pulse modulation; and in addition, the radio communication link between the control operator on the ground and the pilot (which is a vital talk-down link) presents one of the easiest marks for 100% jamming. Accordingly, it is highly desirable to provide detection and information channels which are not so susceptible to counter measures; and the present invention affords an improved landing system having such minimum susceptibility to counter measures, through the utilization of aircraft detection means and information transmission means employing infra-red radiation principles.

In particular, the present invention relies upon a recognition that an aircraft, and particularly the motors thereof, act an an aircraft-to-ground transmitter of infra-red radiation; and in accordance with the present systems, therefore, means are provided adjacent an aircraft landing location, for instance a landing runway, for detecting such infra-red transmissions from an aircraft, and for utilizing the information of such detection to produce a characteristic indication of the position and movement of the approaching aircraft relative to the said landing location. Such detection means comprise, in accordance with the present invention, a plurality of infra-red photoconductive cells disposed adjacent both sides of a landing runway; and each such cell is associated with a grid surface whereby movement of an aircraft, relative to the said cells, tends to modulate the cell outputs. As will be described, this modulation gives a characteristic indication of the position and movement of the approaching aircraft relative to the landing location or runway; and in particular serves to provide signals which may be retransmitted to the aircraft in various manners thereby to permit a controlled approach of the said aircraft.

The retransmitted information could, of course, be effected by a radio link between a ground control tower and the approaching aircraft in accordance with one aspect of the present invention; but, as mentioned previously, such radio links are susceptible to various counter measures. In accordance with the present invention, therefore, such radio links may be replaced by infra-red pulsed transmissions from control tower to plane, in which event such pulsed transmissions can be appropriately audio-modulated thereby to provide a desired talk-down system. In the alternative, however, and in accordance with a preferred embodiment of the present invention such as will be described in detail subsequently, the characteristic signals derived through the detection of the position and movement of an aircraft relative to a landing location are in turn employed for control of infra-red transmitters disposed adjacent the landing location or runway whereby a completely automatic system, comprising infra-red transmission from aircraft to landing position and subsequent retransmission of landing information from the said landing position to the said approaching aircraft, is effected. The information so transmitted from landing position to aircraft is further combined with information available in the aircraft itself, namely, ground speed and altitude information, whereby the various types of information cooperate at the aircraft to give a characteristic indication and characteristic information which may be employed directly by the aircraft pilot in controlling his approach.

Such systems might, at first thought, be considered to be incapable of providing the desired aircraft landing information, for instance due to severe attenuation of infra-red radiation which might exist under conditions of heavy fog. However, such attenuation has been proven, under practical operating conditions, to be no greater than that now experienced on K-band and X-band radar; and as a matter of fact, actual tests with homing systems utilizing infra-red radiation in the intermediate infra-red spectrum, namely, between one and five microns in wavelength, produced ranges in fog conditions which were considerably greater than those obtained under identical conditions on the two radar bands mentioned. It might also be felt that infra-red reception at the aircraft would be difficult due to the high noise-to-signal ratio in the infra-red spectrum produced by the plane's own engines. However, actual investigation of this problem reveals that little or no difficulty will be experienced, provided the receiving cells and optical units associated with the aircraft are highly collimated and are disposed adjacent the nose of the aircraft. Inasmuch as a highly directional characteristic for infra-red reception is in any event desirable to minimize landing error factors, such collimation and disposition of the aircraft infra-red detectors of the present invention become entirely practical.

In actual practice it has been found that even though the aircraft possesses a head-on pattern of minimum infra-red transmissions (at least as it first approaches the field) the signal strength provided by the present invention is still ample for ranges between the plane and landing location of up to 20 miles on a clear, dark night, and of at least two or three miles on a foggy night. Moreover, even though daytime conditions, with the same amount of fog, would tend to lessen the aforementioned ranges by about 30%, the fact nevertheless remains that the aforementioned range determinations were made with a single jet motor (which offers an infra-red signal strength of nearly one hundred times greater from the rear as against the front view), and in propeller-driven planes, this back-to-front signal strength is reduced to about 25:1, whereby the range, looking at the front of a four-motor aircraft, is substantially greater than that mentioned. In addition, infra-red radiation patterns obtained very recently from aircraft reveal that, owing to the ever-increasing power (and, therefore, temperature) of modern engines, this back-to-front signal ratio is reduced in many cases to 15 to 1 (or less) for a twin jet, and only 3 or 4 to 1 for a four-motored propeller-driven aircraft. These calculations are based upon lead sulphide cell response.

It is accordingly an object of the present invention to provide an improved aircraft landing system.

A further object of the present invention resides in the provision of improved aircraft detection means utilizing infra-red principles.

Another object of the present invention resides in the provision of an aircraft landing system having lesser susceptibility to counter measures than has been the case in systems suggested heretofore.

Still another object of the present invention resides in the provision of improved aircraft landing systems which are automatic in operation and which serve to transmit characteristic control information to an approaching aircraft in response to movement of the said aircraft relative to a landing location.

A still further object of the present invention resides in the provision of improved infra-red detection elements and improved infra-red transmission elements, finding particular utility in aircraft landing systems.

A still further object of the present invention resides in the provision of detection and transmission elements for utilization in aircraft landing systems, which elements are more rugged in configuration and which may be made in smaller sizes than has been the case heretofore.

Still another object of the present invention resides in the provision of improved aircraft detection systems which approach the sensitivity and speed of operation characteristic of prior systems, particularly at short range, in structures which are less complex and more reliable in operation than others suggested heretofore.

A still further object of the present invention resides in the provision of improved aircraft detection systems for use in aircraft landing operations, which detection systems employ photoconductive infra-red sensitive structures whereby an approaching aircraft may be readily detected due to the inherent infra-red radiation afforded by such an aircraft.

The foregoing objects, advantages, construction and operation of the present invention will become more readily apparent from the following description and accompanying drawings, in which.

Figure 1:
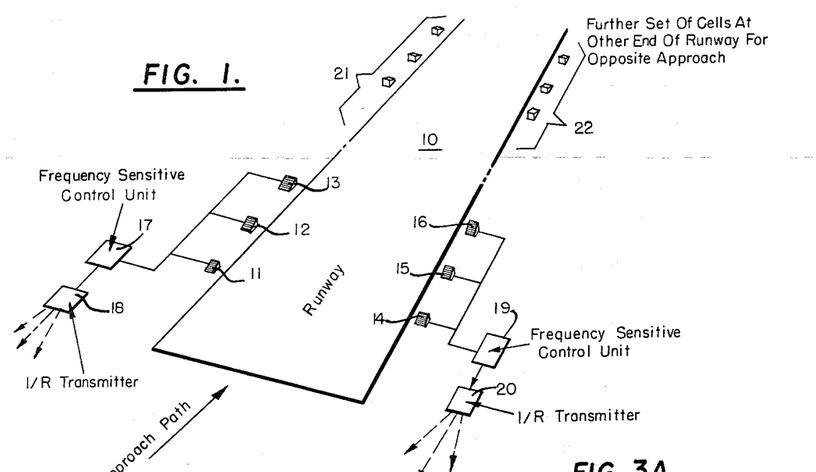
Figure 1 is an illustrative representation of an aircraft landing runway incorporating the improved aircraft detection and information transmission system of the present invention.

Referring now to Figure 1, it will be seen that, in accordance with the present invention, an aircraft detection system associated with an aircraft landing location, such as runway 10, may comprise a first plurality of infra-red sensitive cells 11, 12, 13, etc., disposed along one side of the runway 10 adjacent an approach end thereof; and a further plurality of infra-red sensitive cells 14, 15, 16, etc., disposed along the opposite side of the said runway 10 adjacent said approach end thereof.

In practice, the groups of cells on each side of the runway may be three to six in number, and the said cells are mounted along each side of the runway or landing strips at intervals of a few feet to a few yards from one another. Each cell, as will be described, is protected by a rectangular infra-red transparent cover or radome which may be ground as a lens; and in addition, each cell is disposed substantially flush with the ground at the end thereof nearest the end of the runway. The other, or inner end of each cell (as will become more readily apparent from a subsequent discussion of Figure 4), is raised some three inches or so to provide a tilt angle toward a plane approaching for a landing; and this tilt of the cell establishes a corresponding tilt of the photoconductive surface therein. Each cell also includes a grid structure comprising a plurality of fine grid lines drawn on an infra-red transparent material and interposed between the photoconductive cell and its cover. These grid lines are disposed, in accordance with a preferred embodiment of the present invention, substantially perpendicular to the edge of the runway and substantially parallel to the plane of the said runway; but, as will be readily apparent to those skilled in the art, and by appropriate changes in the circuitry to be described, the said grid lines may, if desired, be disposed substantially 90 degrees to this preferred disposition thereof.

Each of the cells on each side of the runway is coupled to a separate frequency sensitive control unit and infra-red transmitter; and in particular, the cells 11, 12 and 13 may be coupled to a frequency sensitive control unit 17 and infra-red transmitter 18, while the cells 14, 15 and 16 are coupled to a further frequency sensitive control unit 19 and infra-red transmitter 20. The control system on each side of the runway, including the several parallel connected infra-red sensitive cells, thus takes the general configuration illustrated in Figure 5; and this particular portion of the invention will be described subsequently.

The runway 10 may also have infra-red sensitive cells associated with the other end thereof, and tilted in a direction opposite to that of the cells 11 through 16. Such cells have been diagrammatically designated as cells 21 on one side of the runway and cells 22 on the opposite side of the runway; and each of these cell groups 21 and 22 will, of course, be associated with further frequency sensitive control units and further infra-red transmitters adapted to detect the approach of an aircraft and adapted to retransmit characteristic landing control information from the other end of the runway when an aircraft should be approaching from said other end of the runway. Due to the opposite tilt of the groups of cells adjacent the opposed ends of the runway, only those cells adjacent a given end of the runway will tend to be operative for an aircraft approaching that end of the runway; but, if desired, the groups of cells at one or the other end of the said runway may be selectively de-energized, for instance at the control tower, to assure that landing control for a single end of the runway only is effected during an approach.

In operation, and as an aircraft approaches the runway, the infra-red radiation afforded, for instance by the aircraft's motors, is focussed by the aforementioned lens unit associated with each cell onto the infra-red sensitive surface in each such cell whereby the infra-red radiation of the aircraft appears as a spot of infra-red radiation on the cell surface. Movement of the aircraft relative to the runway or landing location causes the said spot of radiation to sweep across the several photoconductive surfaces via the aforementioned grid lines whereby the output of each cell is modulated.

In the particular arrangement to be described, namely, that wherein the grid lines are disposed substantially parallel to the plane of the runway, the two ground transmitters associated with opposite sides of the runway will produce like signals only when the aircraft is on dead-center of the runway; and these like signals will produce no resultant frequency change in the information retransmitted from the landing runway to the aircraft. If, however, the aircraft should tend to veer toward one or the other side of the runway during its approach, or if the aircraft is making its approach at an angle to the runway center, the two ground transmitters associated respectively with opposite sides of the runway will transmit different signals both of which are received, thereby giving a resultant frequency change at the aircraft receiver.

As a result, a direct indication is achieved at the receiver as to the "on" course or "off" course characteristic of the landing approach; and this indication is further such that the pilot may, by appropriate manipulation of his controls, seek to achieve a null condition, or characteristic indicator condition representative of a correct approach. As will be described subsequently, the signal retransmitted to the aircraft from the landing location is further controlled by ground speed and altitude information present at the aircraft itself, whereby the desired landing indication will be presented to the aircraft pilot only when he is within permissible limits of ground speed and altitude.

Figure 2A:
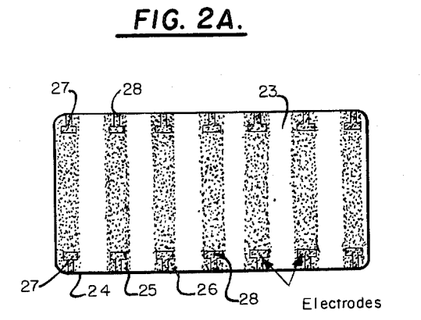
Figures 2A and 2B illustrate the photoconductive faces of infra-red sensitive cells such as may be employed in practicing the present invention.
Figure 2B:
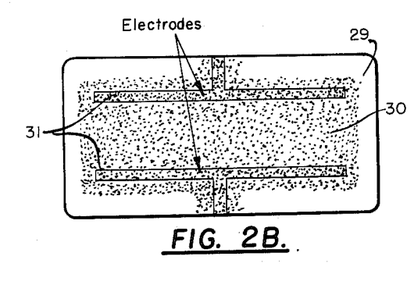

The individual cells 11 through 16 each includes an infra-red sensitive photoconductive surface or surfaces which may take the configuration shown in Figures 2A or 2B. In particular, the cell arrangement shown in Figure 2A comprises an envelope 23 having a plurality of photoconductive infra-red sensitive deposits 24, 25, 26, etc., thereon. Each such deposit may comprise known photoconductive materials, such as lead selenide or lead sulphide; and in accordance with a preferred embodiment of the present invention, the said deposits 24, 25, 26, etc., comprise lead sulphide (PbS). The several photoconductive surfaces are interconnected with appropriate terminals in the cell by means such as aquedag (or other) electrodes or deposits 27, 28, etc. In the alternative, the photoconductive surface comprising the infra-red sensitive cells of the present invention may take the form shown in Figure 2B, and such cells comprise an envelope 29 having a single substantially uniform photoconductive deposit 30 of one of the materials described, and this photoconductive deposit is, as before, coupled to appropriate cell terminals by electrodes or deposits 31.

Figure 3A:
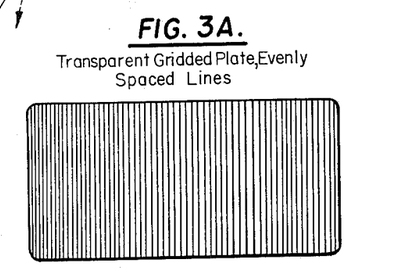
Figures 3A and 3B illustrate grid structures such as may be employed in conjunction with the photoconductive cells of Figures 2A and 2B.
Figure 3B:
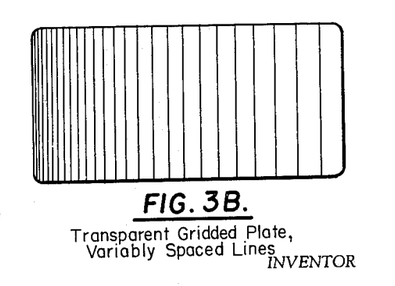

As mentioned previously, the outputs of each of the said cells, comprising the aircraft detection system of the present invention, is associated with a grid structure disposed adjacent to and in front of the photoconductive surface of the cell whereby movement of a spot of infra-red radiation across the said cell via the said grid structure serves to modulate the cell output. Such grid structures may take the forms shown in Figures 3A and 3B; and in particular, the grid plate shown in Figure 3A utilizes a plurality of evenly spaced grid lines, while the grid plate shown in Figure 3B utilizes a plurality of variably spaced grid lines. Either of the grids shown in Figures 3A and 3B may be associated with either of the cell structures shown in Figures 2A or 2B, with the understanding, of course, that the same type of grid structure should be associated with all the cells at a given end of the runway; and with the further understanding that the grid lines should be commonly oriented with respect to the runway plane. The grid disks shown in Figures 3A and 3B must comprise, of course, an infra-red transparent material such as fluorethene, fused quartz, or the like; and the several grid lines on each such disk or plate should preferably be of the inlaid type, with clear, intensely black definition, inasmuch as these grid lines serve to modulate the outputs of the several cell sections in response to movement of a radiation spot thereacross. It should further be noted that the grid disks or plates illustrated in Figures 3A and 3B should be constructed as thin as is mechanically practical to minimize the possibility of parallax distortion.

Figure 4A:
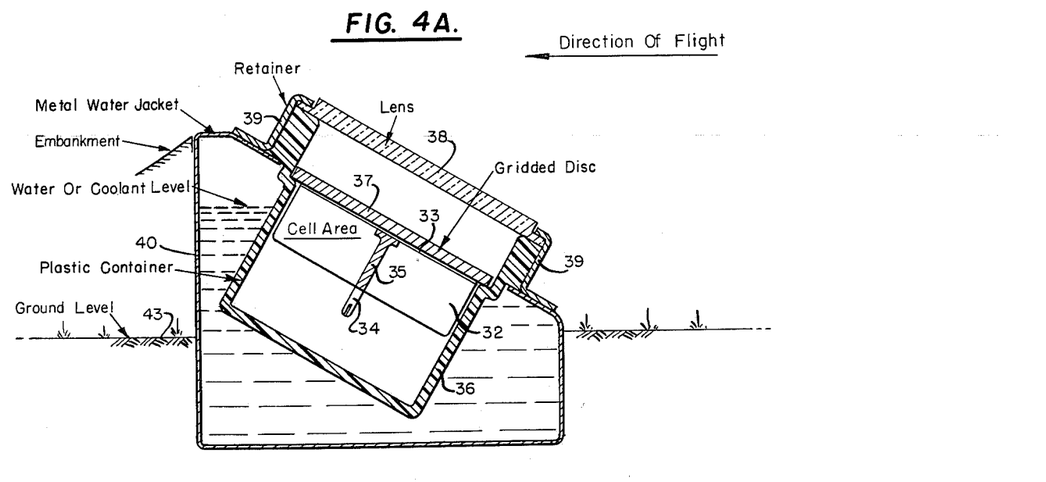
Figures 4A and 4B represent respectively a side and front view of an improved aircraft detection cell, such as may be employed in the present invention.
Figure 4B:
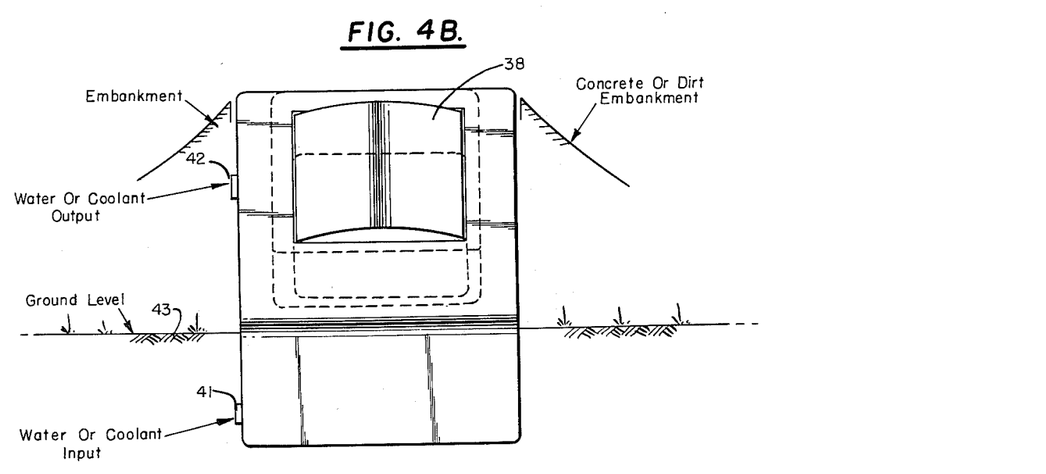

Each of the radiation detecting units 11 through 16 shown in Figure 1 may assume the construction shown in Figures 4A and 4B. In particular, the infra-red sensitive photoconductive cells may each comprise an envelope 32 having the aforementioned photoconductive faces 33 interconnected to terminals 34 by conductive deposits or electrodes 35. Each such cell is mounted in a plastic container 36, and the said plastic container further serves to support a gridded disk 37 and an infra-red transparent lens 38 (preferably comprising one of the infra-red transparent materials mentioned previously). Lens 38 is maintained in place adjacent plastic container 36 by retainers 39 which are in turn mounted on a metal coolant jacket 40. As is illustrated in Figure 4B, an iced water or other coolant input may be provided at 41 in communication with the said metal jacket 40 as well as in communication with the interior of plastic container 36 and the external surfaces of cell envelope 32; and the said container may further be provided with a water or other coolant output 42. The said coolant or iced water circulation is, of course, provided to increase the sensitivity of the cells. Such coolant is not, however, mandatory, and its elimination simply results in a decrease in the sensitivity of the system. The overall cell structure is recessed for the most part below ground level 43 whereby the cell face 33, gridded disk 37 and lens 38 have the near ends thereof disposed closer to ground than are the far ends thereof; and in addition, the cell unit shown in Figures 4A and 4B is preferably embedded in a concrete or dirt embankment sloping away from three sides of the overall unit whereby substantially only the exposed tilted face of the cell is presented to view.

As mentioned previously, a plurality of units, generally of the type shown in Figures 4A and 4B, are disposed in groups adjacent both sides of the landing strip or runway; and each such group of cell units, comprising the aforementioned photoconductive surfaces, gridded disks, and lenses, is associated in turn with a frequency sensitive control unit and infra-red transmitter. The overall arrangement for each group of cells may take the form shown in Figure 5. In particular, it will be noted that a typical detecting cell is illustrated as comprising a photoconductive cell 50 having a gridded infra-red transparent disk 51 disposed adjacent the face thereof; and the output of the said cell 50 is coupled to the input of a cathode follower 52. The outputs of other cells associated with a given side of the runway, adjacent a given end thereof, may be also applied to the said cathode follower 52 on lines 53 respectively.

Figure 5:
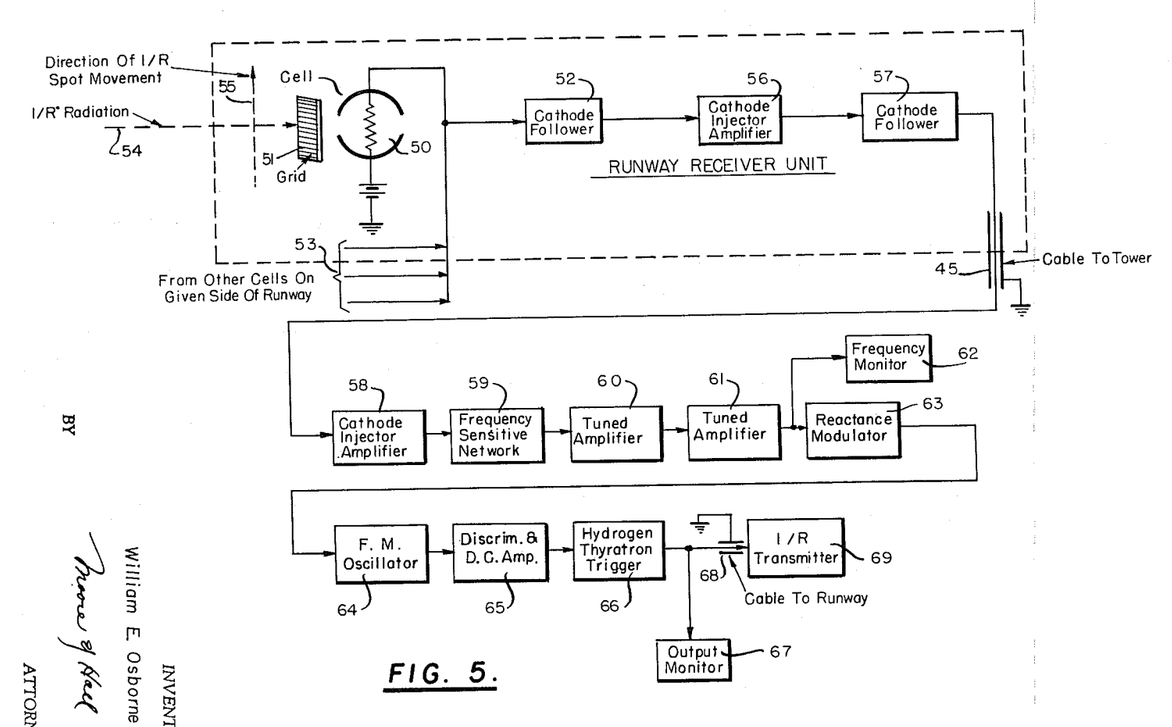
Figure 5 is a block diagram of an improved ground receiver and transmitter constructed in accordance with the present invention.

As stated above, an approaching aircraft tends to radiate infra-red and such infra-red radiation from direction 54 may be focussed by lens means, of the type described, onto the said cell 50 (and onto the cells coupled to lines 53) via infra-red transparent gridded disks such as 51; and movement of the aircraft relative to the several cells cause an infra-red spot to move across the said cells via the said gridded disks, for instance along a line 55. This movement of the infra-red spot serves to cause a modulated output from the several cells whereby an alternating signal is coupled to cathode follower 52. The output of cathode follower 52 pass via a cathode injector amplifier 56, a further cathode follower 57, and still another cathode injector amplifier 58, to the input of a frequency sensitive network 59.

In practice, the units 52, 56 and 57, may be disposed, as indicated by the dotted outline, in a common runway receiver unit disposed adjacent the runway or landing strip; and the output of cathode follower 57 can then be coupled, to the control tower for instance, via a cable 45, to the remaining portion of the circuit to be described. This particular arrangement permits the major portions of the overall ground receiver to be located away from the runway, and preferably in the control tower, whereby the maintenance of the system is substantially enhanced.

Cathode followers 52 and 57 are conventional in configuration, as are cathode injectors 56 and 58; and these units as well as the other units to be described, may, if desired, be completely transistorized thereby to reduce the overall size of the ground receiver. A typical circuit for the cathode followers may also take the form of a vacuum tube having a grid injected signal with the output signal being taken across a cathode resistor; and a typical circuit for the several cathode injector amplifiers utilized may take the form of a unit wherein the signal is injected across a cathode resistor, the control grid is grounded, an an output is taken across an anode impedance. If desired, moreover, cathode follower 52 and cathode injector 56 as well as cathode follower 57 and cathode injector 58, can use the same cathode resistor. It will be appreciated by those skilled in the art that the function of the alternate cathode follower and cathode injector stages shown in Figure 5 is to provide gain and impedance matching; and the use of such cathode followers and cathode injectors also avoids phase reversals during propagation of the signal.

As mentioned previously, the output of cathode injector amplifier 58 is coupled to a frequency sensitive network 59, and this output of unit 58 actually takes the form of an amplified signal having a varying frequency in dependence upon the variable movement of a spot of infra-red radiation relative to the several detecting cells. In practice, the varying frequency output of cathode injector amplifier 58 will normally be between 2 cycles and 500 cycles per second; but it must be emphasized that these particular figures as well as the several other figures to be discussed in respect to the several portions of the present invention, are merely illustrative and variations in frequency will, of course, be effected with variations in the number of grid lines associated with the several disks as well as with variations in other aspects of the invention.

Frequency sensitive network 59 preferably takes the form of an RC network, and serves to accentuate the frequency change appearing at the output of cathode injector amplifier 58. The output of the said frequency sensitive network 59 may then be coupled to two cascade connected tuned amplifiers 60 and 61, which again accentuate the frequency change present, and which serve to increase the signal-to-noise ratio of the system; and the output of tuned amplifier 61 may then be checked by a frequency monitor 62, for instance, which is optional and which may be provided merely to permit observation of the system's operation. The output of tuned amplifier 61 may also be coupled to a reactance modulator 63 which provides a D.C. output bias having a magnitude which is dependent upon the frequency change present in the system; and the output of the said reactance modulator 63 may then serve to control the output of an FM oscillator 64.

In operation, the said FM oscillator 64 may have a fundamental frequency of two to five megacycles and may be arranged to provide a frequency variation, for instance within a one mc. range, in accordance with the magnitude of D.C. bias provided by reactance modulator 63. The output of the said FM oscillator 64 may then be coupled to a discriminator and D.C. amplifier 65, whereby the unit 65 serves to provide a D.C. output which varies in amplitude in accordance with the frequency changes at the input of the system, and this variable D.C. output from unit 65 may then act to control a hydrogen thyratron trigger circuit 66. The operation of unit 66 can, as before, be checked by an output monitor 67 which is optional in nature; and the said output of unit 66 may also be coupled by a cable 68 back to the runway, whereby the said unit 66 controls the output of an infra-red transmitter 69 disposed adjacent that runway.

As mentioned previously, the particular unit shown in Figure 5 is associated with one side only of the runway; and a similar such unit is preferably associated with the cells disposed adjacent the opposite side of the runway. As a result, the units adjacent each side of the runway serve to ultimately control the output of an infra-red transmitter also associated with a given side of the runway; and the two infra-red transmitters so provided then transmit signals from the said runway back toward the approaching aircraft. In operation, it is preferable that the transmitter outputs from the two sides of the runway be somehow distinguishable from one another thereby to aid the pilot in the approaching aircraft to distinguish between an angular approach from one side of the runway and from the other side of the runway. Such distinguishing characteristics can be effected by pulse coding the transmitter output on one side of the runway; or in the alternative, the transmitter output on one side of the runway may be time-delayed slightly from the transmitter output on the other side of the runway, whereby the said two transmitters are effectively operative in alternation.

In either event, however, it will be appreciated that the two transmitters will transmit like signals only when the approaching aircraft is on dead-center of the runway; and this like signal transmission will in turn be characterized by no resultant frequency change at the aircraft receiver. If, however, the approaching aircraft should tend to veer toward one or the other side of the runway, or if the approaching aircraft is approaching at an angle to the runway center, the focussed spots of radiation will be caused to move at differing speeds and in different manners across the gridded disks and photoconductive cells on the two sides of the runway whereby the two transmitters will produce and transmit different signals. As a result, this incorrect approach situation will be characterized by a changing frequency at the aircraft receiver; and if one of the methods for distinguishing between the two transmitters is employed, as mentioned previously, this changing frequency reception will be accompanied by an indication of the direction of the said incorrect approach.

As mentioned previously, the ground receiver and transmitter shown in Figure 5 includes a pair of infrared transmitter units, such as 69, and such infra-red transmitters may take varying configurations. Such transmitters might, for instance, comprise hydrogen peroxide burners or burners of other fuel; but, in practice, the need for fuel replacement in such burners causes some inconvenience. As a result, it may be preferred to use infra-red transmitters employing grooved formers wound with Nichrome wire or other semiconductors; or, in the alternative, to use flash tubes having tungsten or other elements, or any reasonably stable arc, including directly heated magnetron tubes. These latter preferred forms of infra-red transmitters are in fact disclosed in Figures 6A and 6B.

Figure 6A:
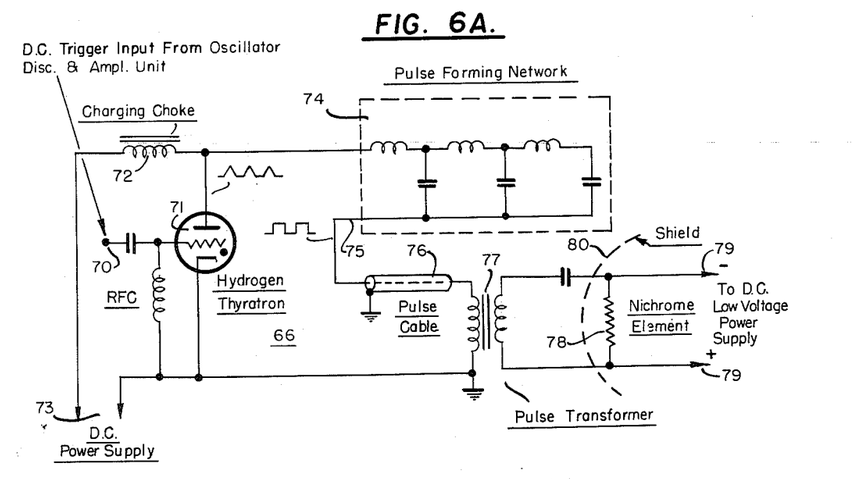
Figure 6A illustrates one form of infra-red transmitter, such as may be employed in the arrangement of Figure 5.

Referring first to the arrangement of Figure 6A which illustrates an infra-red transmitter using Nichrome, it will be noted that a D.C. trigger input from the oscillator, discriminator and D.C. amplifier units 64 and 65, may be coupled to a terminal 70 comprising the input of hydrogen thyratron trigger unit 66. The particular unit illustrated in Figure 6A for hydrogen thyratron 66 is perfectly conventional, and the anode of the hydrogen thyratron 71 is coupled via charging choke 72 to one side of D.C. power supply 73, while the cathode of the said hydrogen thyratron 71 is directly coupled and the grid of the said thyratron 71 is choke-coupled to the other side of the said power supply 73. Hydrogen thyratron unit 66 thus acts to produce a series of spurs or triangular shaped pulse outputs at the anode thereof; and the repetition rate of these pulsed outputs will in turn depend upon the magnitude of D.C. trigger input present at terminal 70.

The output pulses on the anode of hydrogen thyratron 71 may then be coupled to a pulse forming network 74 which serves to shape the said pulses, whereby they appear on line 75 as substantially squarewave pulses. It should further be noted that pulse forming network 74 affords a time delay; and in practice, the pulse forming networks associated with the transmitters on opposite sides of the said runway preferably afford different time delays whereby the desired alternation in transmitter outputs is effected. It will be appreciated, of course, that this alternate output from the two transmitters merely serves to distinguish, at the aircraft receiver, between signals from one or the other of the said transmitters when the said two transmitters are producing different signals representative of "off" course conditions; and the two transmitters will still produce like outputs for an "on" course condition, which will be interpreted at the aircraft receiver as no resultant frequency change.

The squarewave output on line 75 may then be coupled via a pulse cable 76 to the primary winding of a pulse transformer 77; and the secondary of the said pulse transformer may be coupled via a capacitor to a Nichrome element 78 comprising a grooved former wound with Nichrome wire. A D.C. or bias supply 79 is also coupled across Nichrome element 78 to preheat the said element; and the application of pulses from pulse transformer 77 to Nichrome element 78 will therefore cause the heat level of Nichrome wire 78 to exhibit a pulse type variation from the base level provided by bias source 79. The infra-red radiated by Nichrome element 78 may be increased in effectiveness by supplying radiating fins adjacent the said element; and in addition, the directivity of the said radiated heat pattern may be enhanced through the provision of a shield 80 fabricated of a material having poor heat conductivity, such as asbestos fiber, lime, lamp black, or Portland cement. By this arrangement therefore, pulse type infra-red radiation will be effected and retransmitted toward the aircraft, and the frequency of this retransmitted infra-red information will be in accord with the movement of the radiation spot across the runway cells.

While the Nichrome element form of infra-red transmitters described in reference to Figure 6A produces excellent signal strength of radiated energy, this form of infra-red transmitter nevertheless imposes an upper limit on the frequency of pulses which may be retransmitted to the aircraft. This limitation results from the fact that distinct pulses of information are achieved by causing the said Nichrome element to heat-up upon application of a pulse at the secondary of pulse transformer 77; and by permitting the said Nichrome element to cool toward the base heat level imposed by D.C. source 79, intermediate the application of pulses thereto. As the repetition rate of applied pulses increases, the time afforded for this cooling function naturally decreases, whereby the magnitude of transmitted pulse tends to decrease with an increase in applied pulse frequency. As a result, the system shown in Figure 6A operates best at an output frequency of zero to 200 cycles per second; and attempts to increase the output frequency substantially in excess of this upper limit should preferably be avoided.

Figure 6B:
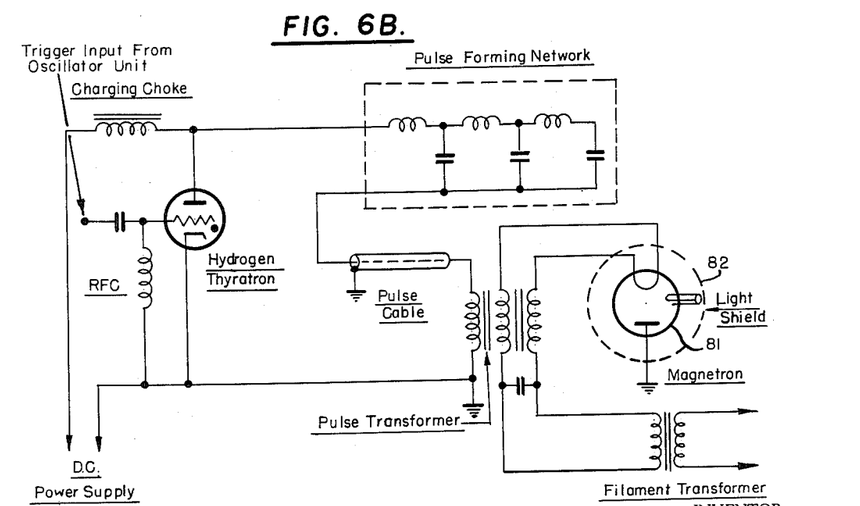
Figure 6B illustrates another form of infra-red transmitter such as may be employed in the arrangement of Figure 5.

When it is desired, however, to operate at an output frequency in excess of 200 cycles per second, it is preferred to use an infra-red transmitter, for instance, of the type shown in Figure 6B; and this particular form of transmitter utilizes a directly heated magnetron whereby operation at frequencies substantially in excess of that for the system already described in reference to Figure 6A may be effected. In a preferred form of the invention, the magnetron infra-red transmitter of Figure 6B may operate between 400 and 1,000 cycles per second, as opposed to the 200-cycle limit of the Figure 6A system.

The arrangement of Figure 6B, in respect to the trigger input, hydrogen thyratron trigger, pulse forming network, pulse cable, and pulse transformer, is identical with that already described in reference to Figure 6A; and accordingly, this portion of the circuit will not be described in further detail. The output of the said pulse transformer, in the arrangement of Figure 6B, may be coupled to a magnetron 81; and inasmuch as the said magnetron 81 (or any equivalent flash tube which might be employed for transmission of infra-red), is not a true black body, a light filter or light shield 82 is preferably added whereby the transmitted radiation is substantially all infra-red in character. The amount of radiated infra-red energy afforded by the magnetron or flash tube unit of Figure 6B is somewhat less than that effected by the arrangement of Figure 6A utilizing a Nichrome element, but this characteristic is offset by the faster and cleaner modulation of the transmitter output which can be effected. This latter operation is, of course, also accompanied by a shortening of the wavelength of maximum infra-red transmission; and this shortened wavelength aids considerably in increasing the sensitivity of the received transmission at the aircraft, particularly if the aircraft receiving device utilizes a lead sulphide or similar cell.

Figure 7:
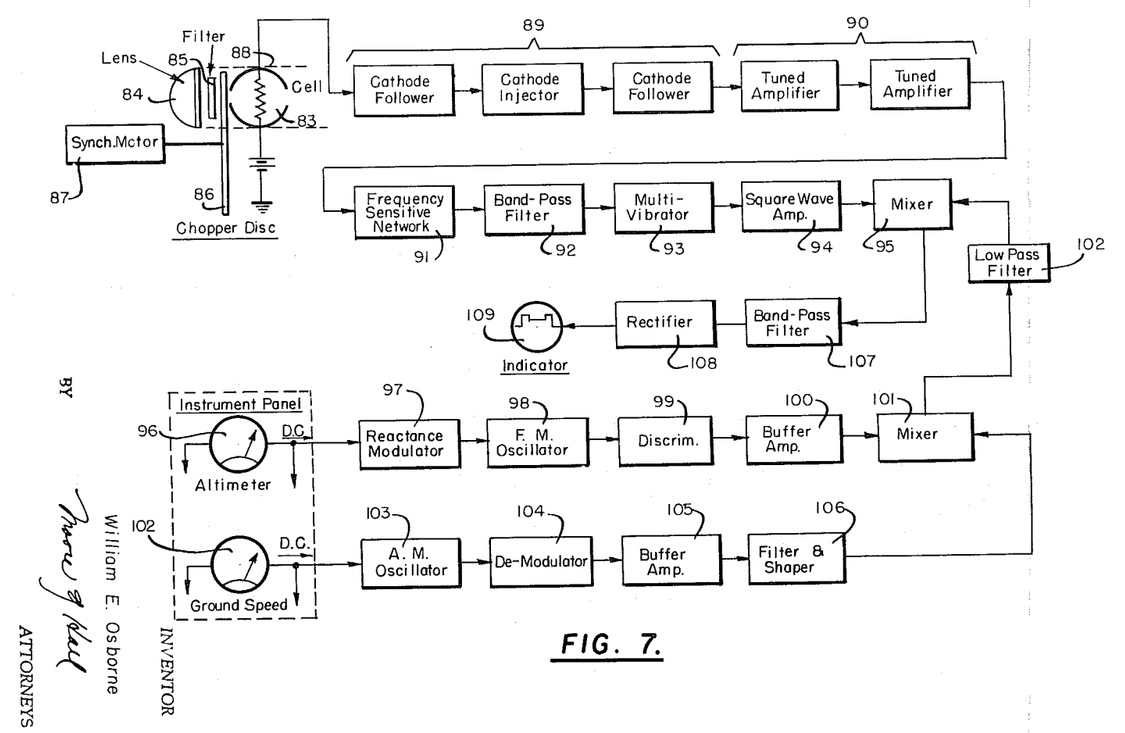
Figure 7 illustrates an airborne receiving and indicating unit such as may be employed in the present invention.

The aircraft or airborne receiving unit may take the form shown in Figure 7; and in particular, the said airborne unit may include an infra-red sensitive photoconductive cell 83, mounted adjacent the nose of the said aircraft, the said cell 83 being associated with an infra-red transparent lens 84, an infra-red filter 85, and a chopper disk 86 driven by synchronous motor 87. An alternative to the chopper disk and motor, however, could take the form of an electronic chopper switch circuit which would commutate the signal preamplifier. The overall arrangement of elements 83 through 86 is arranged in a collimator 88 which serves to avoid reception in the aircraft of infra-red radiation from its own motors. In particular, the receiving cell and lens unit is preferably arranged to provide a narrow field of view not greater than ten degrees, and preferably two to five degrees, whereby little trouble is experienced with motor interference.

Chopper disk 86 may be driven by the synchronous motor 87 at a chopping frequency of, for instance 400, 800 or 1600 cycles per second, depending upon the number of holes in the said disk 86; and in a particular embodiment of the present invention the said synchronous motor 87 rotates at substantially 10,000 r.p.m., with chopper disk 86 having twelve holes therein, so that a chopped output at 1980 cycles/second is provided. The chopper disk 86 tends to increase the gain of the overall airborne receiving unit by providing an A.C. component at a higher frequency than would otherwise be available; and the modulation from the ground transmitters is then superimposed on the chopper frequency.

The output of cell unit 83 will, as mentioned previously, comprise a constant frequency for correct approach conditions, and will comprise a changing frequency for incorrect approach conditions; and this output is then coupled via cathode follower, cathode injector, and further cathode follower units 89, to cascade connected tuned amplifier stages 90; and thence to a frequency sensitive network 91. The function of the cathode follower, cathode injector, tuned amplifier and frequency sensitive network, shown in the arrangement of Figure 7, corresponds to those functions already described for similar such units in reference to Figure 5;

and their overall operation is to accentuate the frequency change detected as well as to increase the signal-to-noise ratio.

The output of frequency sensitive network 91 is coupled to a bandpass filter 92 which serves to reject unwanted frequencies; and in particular, the bandpass filter 92 should be designed to cut off at substantially a frequency of 1980 cycles/second for the particular figures chosen. The output of bandpass filter 92 is then coupled to a multivibrator 93 which is triggered at the modulation frequency; and in the particular arrangement to be described (and because of the particular form of indicator which is chosen for description in Figure 7), the said multivibrator 93 is preferably so designed that it is free-running at two cycles/second, and is triggered at the modulation frequency above two cycles/second. As a result of this particular arrangement, therefore, a lack of resultant frequency change at the input of the receiver unit (characteristic of an "on" course condition) will in turn cause the multivibrator 93 to produce a two-cycles/second free-running output; while presence of a resultant frequency change at the input of the airborne receiver (characteristic of an "off" course condition, or incorrect approach condition) will cause the said multivibrator to be triggered at the modulation frequency. For this latter condition, the said multivibrator 93 will produce an output of, for instance between two and 200 cycles/second, and this multivibrator output is then coupled to a squarewave amplifier 94 which serves to shape the multivibrator output; and the resultant shaped pulses are then coupled to one input of a mixer 95 acting as a gating circuit.

Before proceeding with a further description of this particular portion of the airborne unit, it should be noted that correct aircraft approach conditions include considerations of both ground speed and altitude; and accordingly, the airborne unit of the present invention includes means for taking these latter factors into account in providing landing information. In the particular overall system comprising the present invention, responsibility is placed upon the pilot to assure that the approaching aircraft is within permissible limits of ground speed and altitude; and accordingly, in making an approach, the pilot must observe his altimeter and ground speed indicator to assure that these particular factors of correct approach are being taken into consideration. In addition to this required responsibility upon the pilot, however, the ground speed indicator and altimeter of the aircraft are also linked to the remaining portions of the frequency sensitive receiver, inasmuch as incorrect ground speed or altitude would naturally change the retransmitted frequency and might possibly lead, in extreme circumstances, to a landing attempt on the wrong runway or on no runway at all. In accordance with this further feature of the present invention, therefore, further controlling signals are derived from the altimeter and ground speed indicators, and these signals prevent the indication of landing control information on an indicator within the aircraft until the pilot has corrected to within permissible limits of altitude and ground speed.

In particular, the D.C. controlling signal, which is ordinarily supplied to the aircraft altimeter, such as 96, is also coupled to a reactance modulator 97 whereby the said unit 97 provides a controlling input to an FM oscillator 98. Oscillator 98 is preferably so designed that it provides, for instance, a substantially 200 kc. swing about a 3 mc. mid-frequency; and the output of the said oscillator 98 is then coupled via discriminator 99 and buffer amplifier 100 to one input of a further mixer 101. The input thus applied via buffer 100 to mixer 101 takes the form of a low frequency A.C. signal varying, for instance, between zero and 20 kc., and the frequency of this A.C. output of amplifier 100 tends to increase with increases in altitude.

Similarly, the D.C. controlling signal normally applied to the ground speed indicator 102 of the aircraft is also applied via an AM oscillator 103, a demodulator 104, a buffer amplifier 105, and a filter and shaper 106, to a second input of mixer 101; and again, this second input, derived from the output of unit 106, takes the form of a low frequency A.C. signal, the frequency of which also increases with speed. The altimeter and ground speed units utilize frequency modulation and amplitude modulation principles respectively, thereby to prevent interference between the said two units; and these two units ultimately provide two variable frequency inputs to mixer 101.

The output of mixer 101 thus comprises both the sum and difference frequencies of the signal inputs thereto; and in accordance with the operation of the present system, only the difference frequencies are employed. The output of mixer 101 is accordingly coupled as a gating signal to a second input of the aforementioned mixer 95, via a lowpass filter 102, whereby the occurrence of an output from filter 102 indicates that the pilot has corrected both his altitude and ground speed to within permissible approach conditions; and if either one or both of these factors should be incorrect, no signal will be applied to the second input of mixer 95. Upon occurrence of an input from filter 102 to mixer 95, therefore, a landing condition has been achieved characterized by both correct altitude and ground speed, or altitude and ground speed within permissible limits, whereby mixer 95, acting as a gating circuit, opens to pass an output corresponding to the output of squarewave amplifier 94. This output of mixer 95 is then passed via a bandpass filter 107 and rectifier 108 to an indicator 109 which, in the particular form of the invention shown in Figure 7, comprises a cathode ray tube indicator.

It must be emphasized that the particular type of indicator 109 shown in Figure 7 is merely illustrative, and other forms of indicators, including warning lights or buzzers, metering devices, and means varying the X or Y amplitudes of a cathode ray tube indication, may be employed. For the system shown in Figure 7, however, it will be appreciated that the output of multivibrator 93 and squarewave amplifier 94 will vary between 2 and 200 cycles/second, for incorrect approach conditions; and accordingly, if ground speed and altitude conditions are correct, these pulses of 2 to 200 cycles/second will appear on the face of cathode ray tube 109. For a 200-cycle condition, which is indicative of extremely incorrect direction of approach, albeit correct altitude and speed of approach, the signal will appear as "grass" on the baseline of cathode ray tube 109, and the pilot must then correct his approach in an effort to reduce the pulses appearing on the face of the cathode ray tube down to the two-cycle output of multivibrator 93, which is indicative of dead-center with respect to the runway. Such a correct condition of two cycles/second will appear on the face of cathode ray tube 109 as two spaced pips (see Figure 7).

Conditions of incorrect speed and/or altitude will, of course, block the passage of a signal via mixer 95, whereby the indication on scope 109 will merely be the baseline; and in the alternative, conditions of correct altitude and speed of approach in conjunction with incorrect angle of approach, will be characterized by pips in excess of two on the face of the scope 109. Thus, once the pilot has corrected his aircraft within permissible limits of altitude and speed, he may then further correct his approach in an effort to achieve the characteristic correct approach signal on the scope 109 which is indicative of a correct landing attempt.

Many variations will be suggested to those skilled in the art, and it must therefore be stressed that the foregoing discussion is meant to be illustrative only and should not be considered as limitative of my invention. In particular, as mentioned previously, other forms of indicator devices may be employed; and the correct approach conditions may be represented as any desired pattern or any one or more pips on the scope; or in the alternative, the pilot indication may be effected by other systems, including meter devices and/or warning lights. In addition, while a completely automatic system has been described, it will be appreciated that one of the primary considerations of the present invention comprises the detection of position and movement of an aircraft relative to the landing strip or runway; and approach information may then be reconveyed, by means other than the automatic transmitters, to the aircraft. Such means might include pulse modulated infrared information for talk-down purposes.

It should further be noted that when systems of the type described are employed, various supplementary aids to landing might be utilized; and in particular, infra-red binoculars or the like, worn by the copilot or navigator of the aircraft, could be employed, in which event the infra-red transmissions from the ground transmitters would be clearly observable from the aircraft thereby aiding in the landing attempt. The maximum accuracy of the system occurs when the approaching aircraft is a few hundred yards from the runway approach and at an elevation angle of about 10 degrees from the first cell, i.e., at an altitude of around 100 feet; and for this particular landing condition, the frequency of each cell increases as a plane approaches. Dead-center of the runway is characterized, as mentioned previously, by a zero beat or universal frequency between the two rows of cells in the particular form of the invention described; but many other characteristic indications of correct approach will be suggested to those skilled in the art, and are contemplated within the scope of the present invention.

Still further variations are possible, and all such modifications as are in accord with the principles described are accordingly meant to fall within the scope of the appended claims.

Having thus described my invention, I claim:

1. In an aircraft approach system, aircraft detection means comprising a plurality of intra-red sensitive photoconductive cells disposed in spaced relation to one another at a detection location, means for focussing infra-red radiation, from an aircraft being detected, upon said cells, whereby movement of said aircraft relative to said cells causes a spot of infra-red radiation to scan said cells, grid means disposed between said focussing means and said cells, said grid means comprising a stationary infra-red transparent surface having a plurality of infra-red opaque grid lines thereon whereby movement of said spot across said surface and lines modulates the output of said cells at a rate varying with variations in the rate of said spot movement, and means responsive to the modulated output of said cells for indicating the movement of said aircraft relative to said cells.

2. The combination of claim 1 wherein said last-named means includes means for transmitting approach information from said detection location to said aircraft being detected.

3. The combination of claim 2 wherein said transmitting means includes an infra-red transmitter.

4. The combination of claim 1 wherein said detection location comprises an aircraft landing runway, said cells being disposed in substantially linear spaced relation on both sides of said runway.

5. The combination of claim 4 wherein said grid means comprises a plurality of said infra-red transparent surfaces individually disposed adjacent the photoconductive surfaces of said plurality of cells, each of said grid surfaces including a plurality of said grid lines spaced from one another in substantially parallel relation to the plane of said runway.

6. In an aircraft approach control system, a landing runway having a plurality of photoconductive cells disposed in spaced relation to one another adjacent opposing edges of said runway, a stationary grid element adjacent each of said photoconductive cells, each said grid element comprising a plurality of spaced grid lines whereby movement of an aircraft relative to said cells causes radiation from said aircraft to scan said cells via said grid elements across said grid lines thereby to modulate the outputs of said cells, and control means responsive to the outputs of said cells for producing a signal characteristic of the movement of said aircraft relative to said cells.

7. The combination of claim 6 wherein said control means includes transmitter means for transmitting an approach control signal from said landing runway to an approaching aircraft.

8. The combination of claim 7 including indicating means in said approaching aircraft responsive to said approach control signal for indicating the movement of said aircraft relative to said cells.

9. The combination of claim 8 wherein said transmitter means includes means for transmitting infra-red radiation, said indicating means including a photoconductive element at said aircraft responsive to said transmitted infra-red information.

10. The combination of claim 8 wherein said aircraft includes means producing further signals characteristic of the speed and altitude of said aircraft, said indicating means including means responsive to both said approach control signal and to said further signals for indicating the movement of said aircraft relative to said cells.

11. In an aircraft approach control system, an aircraft landing location, infra-red detection means adjacent said landing location responsive to infra-red radiation transmitted from an approaching aircraft for producing a signal characteristic of the position of said aircraft relative to said landing location, means for modulating said signal in response to movement of said aircraft relative to said detection means, and means responsive to said modulated signal for retransmitting information from said landing location to said aircraft thereby to indicate, in said aircraft, the position and movement of said aircraft relative to said landing location.

12. The combination of claim 11 wherein said last-named means includes pulsed infra-red transmitter means for transmitting a landing control signal from said landing location to said aircraft.

13. In an aircraft approach system, an aircraft landing runway, infra-red detection means disposed adjacent both edges of said runway at an approach end thereof, said detection means including means responsive to infra-red radiation radiated from an approaching aircraft toward said runway for producing an aircraft position signal, transmitter means responsive to said position signal for transmitting a landing control signal from said runway to said approaching aircraft, and indicator means in said approaching aircraft responsive to said landing control signal for indicating the position of said aircraft relative to said runway.

14. The combination of claim 13 wherein said detection means includes first and second groups of photoconductive cells disposed adjacent opposing edges of said runway respectively, said transmitter means including first and second infra-red transmitters, disposed adjacent opposite sides of said runway and responsive, respectively, to outputs from said first and second groups of cells.

15. In an aircraft approach system, an aircraft landing runway, aircraft detection means comprising a plurality of infra-red sensitive photoconductive cells disposed in spaced linear relation to one another adjacent both edges of said runway, grid means comprising a plurality of spaced grid lines adjacent the photoconductive surfaces of said cells whereby infra-red radiation from an approaching aircraft scans said cells via said grid means and lines thereby to modulate the outputs of said cells, and means responsive to the relative outputs of the cells adjacent opposite edges of said runway respectively for indicating the position of said aircraft relative to said runway.

16. The combination of claim 15 including infra-red transmitter means adjacent said runway, said transmitter means being responsive to the outputs of said cells for transmitting an infra-red approach control signal from said runway to said approaching aircraft.

17. In an aircraft approach control system, a landing runway, an aircraft approaching said runway, first means in said aircraft for transmitting infra-red radiation from said aircraft to said runway, means adjacent said runway responsive to said transmitted infra-red radiation for producing a signal characteristic of the position of said aircraft relative to said runway, and second means for transmitting approach control information from said runway to said aircraft in accordance with said positional signal.

18. The combination of claim 17 wherein said second means includes an infra-red transmitter adjacent said runway, and means in said aircraft for detecting infra-red radiation from said second means.

19. In an aircraft approach control system, an aircraft landing runway having infra-red transmitting means disposed adjacent the opposing edges thereof for transmitting infra-red signals toward an approaching aircraft, first means on said aircraft for detecting said infra-red transmissions and including means operative to produce a first signal representative of the position of said aircraft relative to said runway, second means on said aircraft for producing second signals representative of the speed and altitude of said aircraft, and indicator means responsive to both said first and second signals for indicating the movement of said aircraft relative to said runway, said indicator means including means giving a characteristic indication when the position, speed and altitude of said aircraft, relative to said runway, are within predetermined permissible limits for a proper landing attempt on said runway.

20. The combination of claim 19 wherein said indicator means includes means responsive to said second signals for selectively rendering said indicator means non-responsive to said first signals when the speed and altitude of said aircraft exceed said permissible limits.

References Cited in the file of this patent

UNITED STATES PATENTS

| | | |
|---|---|---|
| 1,158,967 | Bellingham | Nov. 2, 1915 |
| 1,343,393 | Hoffman | June 15, 1920 |
| 2,334,085 | Graves | Nov. 9, 1943 |
| 2,392,873 | Zahl | Jan. 15, 1946 |
| 2,412,165 | McDermott | Dec. 3, 1946 |
| 2,421,012 | Chew | May 27, 1947 |
| 2,423,885 | Hammond | July 15, 1947 |